(12) United States Patent
Daniel

(10) Patent No.: US 9,409,250 B2
(45) Date of Patent: Aug. 9, 2016

(54) METHOD AND SYSTEM OF CONTROLLING HEATING CURRENT FOR HOT WIRE PROCESSES

(71) Applicant: LINCOLN GLOBAL, INC., City of Industry, CA (US)

(72) Inventor: Joseph A. Daniel, Sagamore Hill, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 678 days.

(21) Appl. No.: 13/788,152

(22) Filed: Mar. 7, 2013

(65) Prior Publication Data

US 2014/0042129 A1    Feb. 13, 2014

Related U.S. Application Data

(60) Provisional application No. 61/681,345, filed on Aug. 9, 2012.

(51) Int. Cl.
| | | |
|---|---|---|
| B23K 11/00 | (2006.01) | |
| B23K 9/10 | (2006.01) | |
| B23K 26/14 | (2014.01) | |

(52) U.S. Cl.
CPC ........... *B23K 11/0013* (2013.01); *B23K 9/1093* (2013.01); *B23K 26/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,886,696 A * | 5/1959 | Tuthill | ...................... | B23K 9/09 |
| | | | | 219/137 R |
| 4,580,026 A * | 4/1986 | Stol | ...................... | B23K 9/1093 |
| | | | | 219/136 |
| 4,897,523 A * | 1/1990 | Parks | ...................... | B23K 9/125 |
| | | | | 219/130.21 |
| 2002/0117489 A1* | 8/2002 | Arndt | ................... | B23K 9/0953 |
| | | | | 219/130.5 |
| 2006/0289394 A1* | 12/2006 | Revel | ...................... | B23K 9/167 |
| | | | | 219/75 |
| 2011/0297658 A1 | 12/2011 | Peters et al. | | |

* cited by examiner

*Primary Examiner* — Dana Ross
*Assistant Examiner* — Renee Larose
(74) *Attorney, Agent, or Firm* — Perkins Coie LLP

(57) ABSTRACT

A system and method for controlling heating current for hot-wire processes in any of brazing, cladding, building up, filling, hard-facing overlaying, welding, and joining applications is provided. The system includes a high intensity energy source configured to heat at least one workpiece to create a molten puddle. The system also includes a feeder subsystem that includes a wire feeder configured to feed a filler wire to the molten puddle, a first power supply configured to supply a first current through a first length of the filler wire, and a second power supply configured to supply a second current through a second length of the filler wire. The first current and the second current provide a power sufficient to resistance-heat the filler wire to at or near a melting temperature of the filler wire, and in some embodiment, the first power supply provides more than 50% of the power.

18 Claims, 4 Drawing Sheets

METHOD AND SYSTEM OF CONTROLLING HEATING CURRENT FOR HOT WIRE PROCESSES

PRIORITY

The present application claims priority to U.S. Provisional Patent Application No. 61/681,345, which is incorporated herein by reference in its entirety.

TECHNICAL FIELD

Certain embodiments relate to controlling heating current in hot wire filler wire processes used in any of brazing, cladding, building up, filling, hard-facing overlaying, welding, and joining applications. More particularly, certain embodiments relate to a system and method to control heating current in filler wire using a dual contact tube configuration in combination with a filler wire feed and energy source system for any of brazing, cladding, building up, filling, hard-facing overlaying, joining, and welding applications.

BACKGROUND

The traditional filler wire method of welding (e.g., a gas-tungsten arc welding (GTAW) filler wire method) can provide increased deposition rates and welding speeds over that of traditional arc welding alone. In such welding operations, the filler wire, which leads a torch, can be resistance-heated by a separate power supply. The wire is fed through a contact tube toward a workpiece and extends beyond the tube. The extension is resistance-heated to aid in the melting of the filler wire. A tungsten electrode may be used to heat and melt the workpiece to form the weld puddle. A power supply provides a large portion of the energy needed to resistance-melt the filler wire. In some cases, the wire feed may slip or falter and the current in the wire may cause an arc to occur between the tip of the wire and the workpiece. The extra heat of such an arc may cause burnthrough and spatter. The risk of such an arc occurring is greater at the start of the process where the wire initially comes in contact with the workpiece at a small point. If the initial current in the wire is too high, the point may burn away, causing an arc to occur.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method to use a dual contact tube configuration in resistance-heating a filler wire as the filler wire is added to a molten puddle for a welding operation. In some embodiments, the system includes a high intensity energy source configured to heat at least one workpiece to create a molten puddle. The system also includes a feeder subsystem that includes a wire feeder configured to feed a filler wire to the molten puddle, a first power supply configured to supply a first current through a first length of the filler wire, and a second power supply configured to supply a second current through a second length of the filler wire. The first current and the second current provide a power sufficient to resistance-heat the filler wire to at or near a melting temperature of the filler wire, and in some embodiments, the first power supply provides more than 50% of the power. The first length is different than the second length.

In some embodiments, the method includes heating at least one workpiece to create a molten puddle and feeding a filler wire to the molten puddle. The method also includes supplying a first current through a first length of the filler wire and a second current through a second length of the filler wire. The first current and the second current provide a power sufficient to resistance-heat the filler wire to at or near a melting temperature of the filler wire, and in some embodiments, the first current provides more than 50% of the power.

In some embodiments, the method further includes applying energy from a high intensity energy source to at least one workpiece to heat the at least one workpiece at least while applying resistance heating to the filler wire using a dual contact tube configuration. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
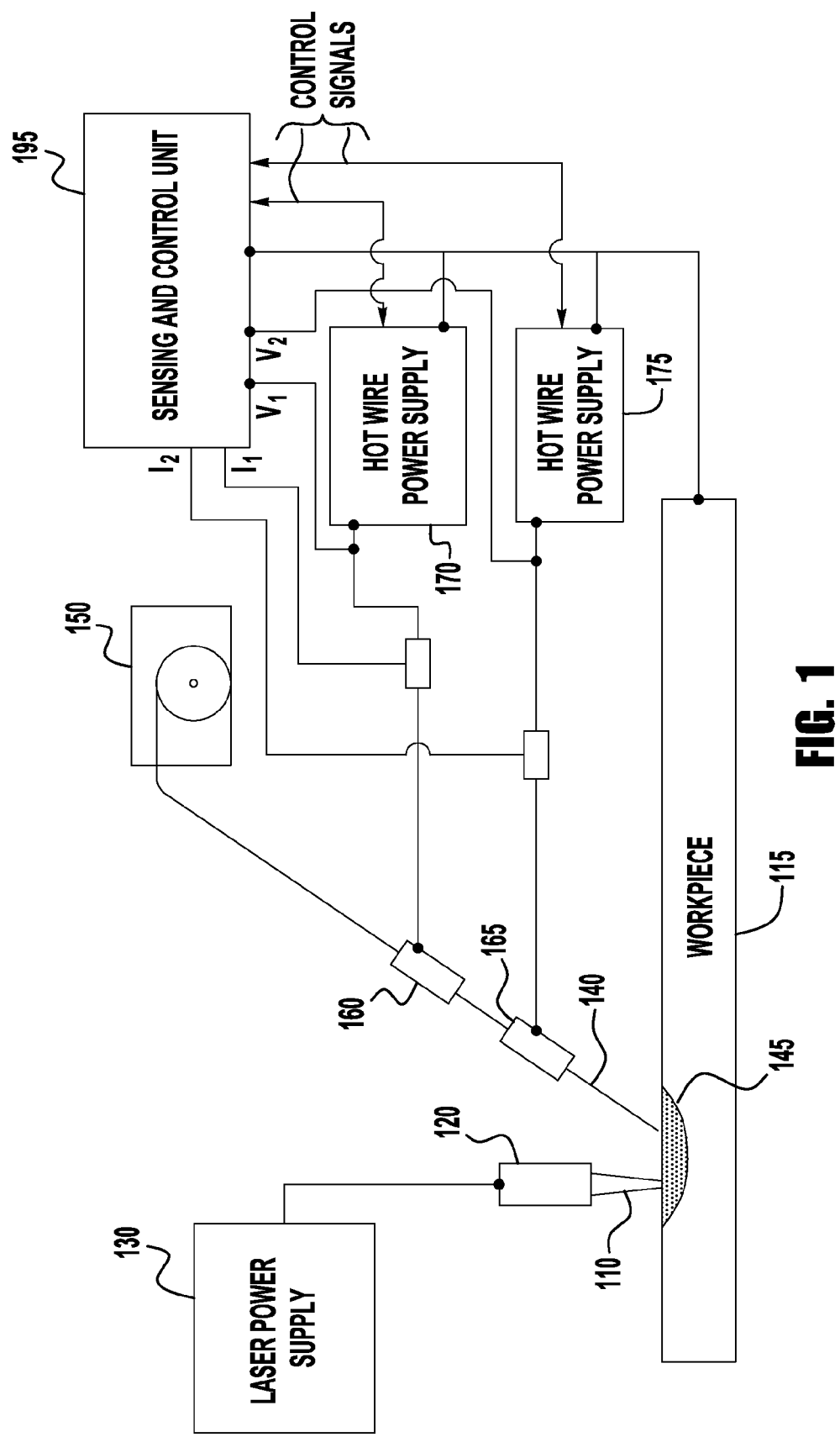
FIG. 1 illustrates a functional schematic block diagram of an exemplary embodiment of a combination filler wire feeder and energy source system for any of brazing, cladding, building up, filling, hard-facing overlaying, and joining/welding applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is known that welding/joining operations typically join multiple workpieces together in a welding operation where a filler metal is combined with at least some of the workpiece metal to form a joint. Because of the desire to increase production throughput in welding operations, there is a constant need for faster welding operations, which do not result in welds which have a substandard quality. This is also true for cladding/surfacing operations, which use similar technology. It is noted that although much of the following discussions will reference "welding" operations and systems, embodiments of the present invention are not just limited to joining operations, but can similarly be used for cladding, brazing, overlaying, etc.—type operations. Furthermore, there is a need to provide systems that can weld quickly under adverse environmental conditions, such as in remote work sites. As described below, exemplary embodiments of the present invention provide significant advantages over existing welding technologies. Such advantages include, but are not limited to, reduced total heat input resulting in low distortion of the workpiece, very high welding travel speeds, very low spatter rates, welding with the absence of shielding, welding plated or coated materials at high speeds with little or no spatter and welding complex materials at high speeds.

FIG. 1 illustrates a functional schematic block diagram of an exemplary embodiment of a combination filler wire feeder and energy source system 100 for performing any of brazing, cladding, building up, filling, hard-facing overlaying, and joining/welding applications. The system 100 includes a laser subsystem 130/120 capable of focusing a laser beam 110 onto a workpiece 115 to heat the workpiece 115 to create a molten puddle, i.e., weld puddle 145. The laser subsystem includes a laser device 120 and a laser power supply 130 operatively connected to each other. The laser power supply 130 provides power to operate the laser device 120. The laser subsystem is a high intensity energy source. The laser subsystem can be any type of high energy laser source, including but not limited to carbon dioxide, Nd:YAG, Yb-disk, YB-fiber, fiber delivered or direct diode laser systems. Further, even white light or quartz laser type systems can be used if they have sufficient energy. Other embodiments of the system may include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source. The following specification will repeatedly refer to the laser system, beam and power supply, however, it should be understood that this reference is exemplary as any high intensity energy source may be used. For example, a high intensity energy source can provide at least 500 W/cm$^2$.

It should be noted that the high intensity energy sources, such as the laser devices 120 discussed herein, should be of a type having sufficient power to provide the necessary energy density for the desired welding operation. That is, the laser device 120 should have a power sufficient to create and maintain a stable weld puddle throughout the welding process, and also reach the desired weld penetration. For example, for some applications, lasers should have the ability to "keyhole" the workpieces being welded. This means that the laser should have sufficient power to fully penetrate the workpiece, while maintaining that level of penetration as the laser travels along the workpiece. Exemplary lasers should have power capabilities in the range of 1 to 20 kW, and may have a power capability in the range of 5 to 20 kW. Higher power lasers can be utilized, but can become very costly.

System 100 also includes a hot filler wire feeder subsystem capable of providing at least one resistive filler wire 140 to make contact with the weld puddle 145 in the vicinity of the laser beam 110. The hot filler wire feeder subsystem includes a filler wire feeder 150, an upstream contact tube 160, a downstream contact tube 165, and hot wire power supplies 170 and 175. The wire 140 is fed from the filler wire feeder 150 through contact tubes 160 and 165 toward the workpiece 115 and extends beyond the contact tube 165. The wire 140 is resistance-heated such that the portion extending beyond tube 165 approaches or reaches the melting point before contacting the weld puddle 145 on the workpiece 115. The laser beam 110 serves to melt some of the base metal of the workpiece 115 to form the weld puddle 145 and may also help melt the wire 140 onto the workpiece 115. The feeder subsystem may be capable of simultaneously providing one or more wires, in accordance with certain other embodiments of the present invention. For example, a first wire may be used for hard-facing and/or providing corrosion resistance to the workpiece, and a second wire may be used to add structure to the workpiece.

During operation, the filler wire 140 is resistance-heated by an electrical current from power supplies 170 and 175, which are each operatively connected between the respective contact tubes 160 and 165 and the workpiece 115. As shown in FIG. 1, the downstream contact tube 165 is proximate to the workpiece 115. In an embodiment of the present invention, power supplies 170 and 175 are pulsed direct current (DC) power supplies, although alternating current (AC) or other types of power supplies are possible as well. In a non-limiting embodiment, power supply 170 provides a large portion of the heating current to wire 140 and power supply 175 provides the remaining portion of the necessary heating current through wire 140. In another non-limiting embodiment, power supply 170 provides more than 50% of the power needed to heat wire 140 to at or near its melting point. In some exemplary embodiments, power supply 170 may provide 75-95% of the power needed to heat wire 140 to at or near its melting point. Because a large portion of the heating current is supplied by power supply 170, power supply 175 can be relatively small and more responsive to control signals when adjusting the heating current through wire 140. These adjustments may be needed based on changes in the welding process, e.g., fluctuations in the high energy heat source, disturbances in the filler wire feed due to slips or faltering, changes in the welding environment, etc. In an exemplary embodiment, power supply 170 is a high inductance power supply. As such, the heating current from power supply 170 will remain relatively stable even when there are minor disturbances in the welding process. In yet another exemplary embodiment, power supply 175 is a low inductance power supply. As such, power supply 175 will be more responsive to control signals when adjusting the heating current through wire 140 to compensate for fluctuations or anomalies in the welding process. For example, the power supply 175 has an inductance—for its current output circuit (that is, the output circuit in the power supply 175 which is used to output the current to the filler 140)—in the range of 40 to 70 micro henries with a saturation current in the range of 20 to 50 amps. However, the power supply 170 can have a higher inductance level—for its output circuit—than the power supply 175. In an exemplary embodiment, the inductance level for the welding circuit of the power supply 170 is in the range of 15 to 80 milli henries with a saturation current in the range of 20 to 50 amps. In a further exemplary embodiment, the inductance is no more than 100 milli henries with a saturation current in the range of 20 to 50 amps. Of course, these ranges are for exemplary embodiments of the present invention, and other systems may have different values and still operate within the spirit and scope of the present invention.

The system 100 may further include a sensing and control unit 195 that is operatively connected to the workpiece 115 and contact tubes 160 and 165 (i.e., effectively connected to the outputs of power supplies 170 and 175) and is capable of measuring the potential difference between the output of each power supply and the workpiece 115, i.e., voltages $V_1$ and $V_2$, respectively, for power supplies 170 and 175. The sensing and control unit 195 also measures the currents provided by each of the power supplies that go through the filler wire 140 to workpiece 115, i.e., currents $I_1$ and $I_2$, respectively, for power supplies 170 and 175. The sensing and current control unit 195 may further be capable of calculating resistance values (R=V/I) and/or power values (P=V*I) for each power supply from the measured voltages and currents. In general, when the filler wire 140 is in contact with the workpiece 115, the potential difference between the filler wire 140 and the workpiece 115 is zero volts or very nearly zero volts. As a result, the sensing and current control subsystem 195 is capable of sensing when the resistive filler wire 140 is in contact with the workpiece 115 and is operatively connected to the power supplies 170 and 175 to be further capable of controlling the flow of current through the resistive filler wire 140 in response to the sensing, as is described in more detail later herein. The sensing and control unit 195 is illustrated in FIG. 1 as a separate unit that controls both power supplies 170 and 175. However, in accordance with some embodiments of the present invention, the sensing and control unit 195 may be an integral part of at least one power supply. When integral to both power supplies, the sensing and control units of power supplies 170 and 175 may be configured to communicate with each other to control the heating current flowing through wire 140.

In exemplary embodiments of the present invention, the wire feed system includes a dual contact tube configuration. In FIG. 1, the dual contact tube configuration is illustrated as separate contact tubes 160 and 165. However, contact tubes 160 and 165 may be integrated into a single unit. The upstream contact tube 160 is coupled to power supply 170 and the downstream contact tube 165 is coupled to power supply 175. As indicated earlier, each power supply may provide a portion of the current needed to heat wire 140 to at or near its melting temperature. For example, power supply 170 may provide more than 50% of the current to heat wire 140 in some embodiments—in other embodiments, it may provide 75-95% of the current. The current from each power supply passes to the wire 140 via contact tubes 160 and 165 (which can be of any known construction) and then into the workpiece 115. This resistance heating current causes the wire 140 to reach a temperature at or near the melting temperature of the filler wire 140 being employed as the wire 140 enters the weld puddle 145. Of course, the melting temperature of the filler wire 140 will vary depending on the size and chemistry of the wire 140. Accordingly, the desired temperature of the filler wire 140 during welding will vary depending on the type of wire being used. As will be further discussed below, the desired operating temperature for the filler wire 140 can be a data input into the welding system so that the desired wire temperature is maintained during welding. In any event, the temperature of the wire 140 should be such that the wire 140 is consumed into the weld puddle 145 during the welding operation. In exemplary embodiments, at least a portion of the filler wire 140 is solid as the wire 140 enters the weld puddle 145. For example, at least 30% of the filler wire 140 is solid as the filler wire 140 enters the weld puddle 145.

In an exemplary embodiment of the present invention, power supplies 170 and 175 supply a current which maintains at least a portion of the filler wire 140 at a temperature at or above 75% of its melting temperature. For example, when using a mild steel filler wire the temperature of the wire before it enters the puddle can be approximately 1,600° F., whereas the wire has a melting temperature of about 2,000° F. Of course, it is understood that the respective melting temperatures and desired operational temperatures will varying on at least the alloy, composition, diameter and feed rate of the filler wire. In another exemplary embodiment, the power supplies 170 and 175 collectively maintain a portion of the filler wire at a temperature at or above 90% of its melting temperature. In further exemplary embodiments, portions of the wire are maintained at a temperature of the wire which is at or above 95% of its melting temperature. In exemplary embodiments, the wire 140 will have a temperature gradient from the point at which the heating current is imparted to the wire 140 and the weld puddle 145, where the temperature at the weld puddle 145 is higher than that at the input point of the heating current. It is desirable to have the hottest temperature of the wire 140 at or near the point at which the wire 140 enters the puddle 145 to facilitate efficient melting of the wire 140. Thus, the temperature percentages stated above are to be measured on the wire 140 at or near the point at which the wires enters the weld puddle 140. By maintaining the filler wire 140 at a temperature close to or at its melting temperature the wire 140 is easily melted into or consumed into the weld puddle 145 created by the heat source/laser 120. That is, the wire 140 is of a temperature which does not result in significantly quenching the weld puddle 145 when the wire 140 makes contact with the puddle 145. Because of the high temperature of the wire 140 the wire melts quickly when it makes contact with the weld puddle 145. It is desirable to have the wire temperature such that the wire 140 does not bottom out in the weld pool—make contact with the non-melted portion of the weld pool. Such contact can adversely affect the quality of the weld.

As described previously, in some exemplary embodiments, the complete melting of the wire 140 can be facilitated only by entry of the wire 140 into the weld puddle 145. However, in other exemplary embodiments the wire 140 can be completely melted by a combination of the weld puddle 145 and the laser beam 110 impacting on a portion of the wire 140. In yet other embodiments of the present invention, the heating/melting of the wire 140 can be aided by the laser beam 110 such that the beam 110 contributes to the heating of the wire 140. However, because many filler wires 140 are made of materials which can be reflective, if a reflective laser type is used the wire 140 should be heated to a temperature such that its surface reflectivity is reduced, allowing the beam 110 to contribute to the heating/melting of the wire 140. In exemplary embodiments of this configuration, the wire 140 and beam 110 intersect at the point at which the wire 140 enters the puddle.

As also discussed previously with regard to FIG. 1, power supplies 170 and 175 and the sensing and control unit 195 control the heating current to the wire 140 such that, during welding, the wire 140 maintains contact with the workpiece (i.e., weld puddle 145) and no arc is generated. Contrary to arc welding technology, the presence of an arc when welding with embodiments of the present invention can result in significant weld deficiencies. Thus, in some embodiments (as those discussed above) the voltage between the wire 140 and the weld puddle 145 should be maintained at or near 0 volts—which indicates that the wire is shorted to or in contact with the workpiece 115.

However, in other exemplary embodiments of the present invention it is possible to provide a current at such a level so that a voltage level above 0 volts is attained without an arc being created. By utilizing higher currents values, it is possible to maintain the filler wire 140 at temperatures at a higher level and closer to its melting temperature. This allows the welding process to proceed faster. In exemplary embodiments of the present invention, sensing and control unit 195 monitors the voltage(s) $V_1$ and/or $V_2$ at contact tubes 160 and 165, respectively, and as the voltage(s) reaches (reach) or approaches (approach) a voltage value at some point above 0 volts the control unit 195 adjusts power supply 175 and/or power supply 170 to ensure that no arc is created by reducing or stopping the current flowing into the wire by 140. The voltage threshold level will typically vary, at least in part, due to the type of welding electrode 140 being used. For example, in some exemplary embodiments of the present invention the threshold voltage level is at or below 6 volts. In another exemplary embodiment, the threshold level is at or below 9 volts. In a further exemplary embodiment, the threshold level is at or below 14 volts, and in an additional exemplary embodiment; the threshold level is at or below 16 volts. For example, when using mild steel filler wires the threshold level for voltage will be of the lower type, while filler wires which are for stainless steel welding can handle the higher voltage before an arc is created.

In further exemplary embodiments, rather than maintaining a voltage level below a threshold, such as above, the voltage(s) at contact tube 160 and/or contact tube 165 is (are) maintained in an operational range. In such an embodiment, it is desirable to maintain the voltage(s) at contact tube 160 and/or 165 above a minimum amount—ensuring a high enough current through filler wire 140 to maintain the wire at or near its melting temperature but below a voltage level such that no welding arc is created. For example, the voltage(s) can be maintained in a range of 1 to 16 volts. In a further exemplary embodiment the voltage(s) can be maintained in a range of 6 to 9 volts. In another example, the voltage(s) can be maintained between 12 and 16 volts. Of course, the desired operational range can be affected by the filler wire 140 used for the welding operation, such that a range (or threshold) used for a welding operation is selected, at least in part, based on the filler wire used or characteristics of the filler wire used. In utilizing such a range, the bottom of the range is set to a voltage at which the filler wire can be sufficiently consumed in the weld puddle 145 and the upper limit of the range is set to a voltage such that the creation of an arc is avoided.

In a non-limiting embodiment, power supply 175 is a low inductance power supply that can rapidly adjust to changes in the welding process and power supply 170 is high inductance power supply that will provide a stable current flow despite minor fluctuations in the welding process. In some embodiments of the present invention, control unit 195 will first regulate the voltage using the low inductance power supply 175 before regulating the high inductance power supply 170. In another exemplary embodiment, control unit 195 may be configured to adjust low inductance power supply 175 to regulate the threshold voltage level or operational voltage range as discussed above to provide the necessary adjustments. Control unit 195 may also be configured to control high inductance power supply 170 to maintain a minimum stable current flow that will provide enough current to maintain the filler wire 140 at or above 75% of its melt temperature. In another embodiment, the high inductance power supply 170 will provide enough current to maintain the filler wire 140 at or above 90% of its melt temperature. In yet another embodiment, the high inductance power supply will provide enough current to maintain the filler wire 140 at or above 95% of its melt temperature.

As described previously, as the voltage exceeds a desired threshold voltage the heating current from power supplies 170 and/or 175 is reduced or shut off such that no arc is created. This aspect of the present invention will be discussed further below. For example, the current provided by the power supply 170 can be at a level which provides the majority of the heating current but also at a level which is below an arc generation level so that this current alone could never create an arc, and the power supply 175 provides an additional amount of current that further heats the filler 140 and makes the total current come very close to an arc generation current. In such a configuration, the power supply 175 is used as a fine current control power supply while the power supply 170 provides a constant current. In such an embodiment, an arc will not be generated but if an arc detection event is detected the total heating current will not be shut off (thus providing no heating to the filler 140) but rather the current from the power supply 170 is still being provided and thus still heating the filler 140, albeit at a lower level of current. In other embodiments, the outputs of both the power supplies 170 and 175 can be adjusted to control the heating current, and in yet further embodiments the output current of the power supply 170 can be adjusted alone to control the heating current.

In further exemplary embodiments, the heating currents, $I_1$ and $I_2$, can also be monitored and/or regulated by control unit 195 using power supplies 170 and 175. This can be done in addition to monitoring voltages $V_1$ and $V_2$, the power provided by each power supply in heating wire 140, or some level of a voltage/amperage characteristic for each power supply as an alternative. That is, the current from each power supply 170/175 can be maintained at a desired level or levels to ensure that the wire 140 is maintained at an appropriate temperature—for proper consumption in the weld puddle 145, but yet below an arc generation current level. For example, in such an embodiment the voltages $V_1$ and $V_2$ and/or the currents $I_1$ and $I_2$ are being monitored to ensure that either the voltages or currents or both are within a specified range or below a desired threshold. The control unit 195 then regulates power supply 175 and/or power supply 170 to control the total current supplied to wire 140 to ensure that no arc is created but still ensuring that the desired operational parameters are maintained. In a non-limiting embodiment, power supply 175 is a low inductance power supply that can rapidly adjust its output current to changes in the welding process, and power supply 170 is a high inductance power supply that can provide a stable current flow despite minor fluctuations in the welding process. In some embodiments of the present invention, control unit 195 will first regulate the current flowing through wire 140 using the low inductance power supply 175 before adjusting the high inductance power supply 170.

In yet a further exemplary embodiment of the present invention, the heating power (V×I) for each power supply 170 and 175 can also be monitored and regulated by the control unit 195. Specifically, in such embodiments the respective voltages $V_1$ and $V_2$ and current $I_1$ and $I_2$ are used in calculating the heating power for each power supply and each heating power is monitored to be maintained at a desired level, or in a desired range. Thus, the control unit 195 not only regulates the voltages or currents from each power supply, but can regulate both the current and the voltage from each power supply. Such an embodiment may provide improved control over the welding system. In such embodiments the total heating power to the wire 140 can be set to an upper threshold level or an optimal operational range such that the power is to be maintained either below the threshold level or within the desired range (similar to that discussed above regarding the voltage). Again, the threshold or range settings will be based on characteristics of the filler wire 140 and the type of welding being performed, and can be based—at least in part—on the filler wire selected. For example, it may be determined that an optimal power setting for a mild steel electrode having a diameter of 0.045" is in the range of 1950 to 2,050 watts. The control unit 195 will regulate the voltages and currents from each power supply 170 and 175 such that the total power remains in this operational range. Similarly, if the power threshold is set at 2,000 watts, the control unit 195 will regulate the voltages and currents from each power supply 170 and 175 so that the total power level does not exceed but is close to this threshold. As before, in a non-limiting embodiment, power supply 175 is a low inductance power supply, and power supply 170 is high inductance power supply. In this case, control unit 195 can be configured to regulate the total power by initially regulating the voltage and current from low inductance power supply 175 as high inductance power supply provides a predetermined portion of the heating current.

It should be noted that the present invention contemplates that the control method used for power supply 170 may be the same or different from that used for power supply 175 during the same welding process. That is, the power supplies may use any combination of the above control methods discussed above (and later in this specification). For example, control unit 195 may be configured to regulate the output voltage of power supply 175 and the output current of power supply 170.

In further exemplary embodiments of the present invention, the control unit 195 contains circuits which monitor the rate of change of the heating voltage (dv/dt), current (di/dt), and or power (dp/dt) for one or both of the power supplies. Such circuits are often called premonition circuits and their general construction is known. In such embodiments, the rate of change of the voltage, current and/or power is monitored such that if the rate of change exceeds a certain threshold the heating current to the wire 140 is reduced or turned off.

In an exemplary embodiment of the present invention, the change of resistance (dr/dt) is also monitored by control unit 195. In such an embodiment, the resistance in the wire between the contact tubes 160 and 165 and the weld puddle 145 is monitored. During welding, as the wire heats up, it starts to neck down and has a tendency to form an arc, during which time the resistance in the wire increases exponentially. When this increase is detected, the current from the power supplies is reduced or turned off as described herein to ensure an arc is not created. Embodiments regulate the voltage, current, or both, to ensure that the resistance in the wire is maintained at a desired level.

As discussed above, the control unit 195 can reduce the heating current in wire 140 to a non-arc generation level when a threshold voltage has been reached by controlling the output of at least one of power supplies 170 and 175. Such a heating current level can be a background current level where no arc will be generated if the wire is separated from the weld puddle 145. For example, an exemplary embodiment of the present invention can have a non-arc maintaining current level in the range of 10 to 30 amps, where once an arc generation is detected or predicted, or an upper threshold (discussed above) is reached, the control unit 195 drops the heating current from one or both power supplies 170 and 175 to a non-arc generation level for either a predetermined amount of time (for example, 1 to 10 ms) or until the detected voltage, current, power, and/or resistance drops below the upper threshold. Of course, the non-arc generation current level described above is exemplary and can be different based on welding parameters. This non-arc generation threshold can be a voltage level, current level, resistance level, and/or a power level. In such embodiments, by maintaining a current output during an arc generation event—albeit at a low level—it can cause a quicker recovery to the heating current operational level.

For example, in a non-limiting embodiment, power supply 175 is a low induction power supply and power supply 170 is a high inductance power supply. High inductance power supply 170 may be controlled such that it provides a large portion of the heating current needed to heat wire 140 to at or near its melting temperate but below a non-arc generation level. Low inductance power supply 175 provides the remaining portion of the heating current needed to heat wire 140 to at or near its melting temperature. When a threshold voltage has been reached, control unit 195 may drop the heating current from power supply 175 such that the total heating current to wire 140 drops below the arc generation level for a predetermined amount of time (for example, 1 to 10 ms) or until the detected voltage, current, power, and/or resistance drops below the upper threshold. Because power supply 175 is a low inductance power supply, it will be very responsive to the control signals from control unit 195. Because power supply 170 is a high inductance power supply, its output current will be stable (i.e., it will not fluctuate due to disturbances the welding process) and thus will not generate an arc due to these disturbances.

As discussed above, in some exemplary embodiment of the present invention, the outputs of the power supplies 170 and 175 are controlled such that no substantial arc is created between a physical gap between the distal end of the filler wire 140 and the weld puddle 145. For example, exemplary embodiments of the present invention prevent the arc from being created by keeping the filler wire 140 in contact with the puddle 145. However, in some exemplary embodiments, the presence of an insubstantial arc will not compromise the quality of the weld. That is, in some exemplary welding operations the creation of an insubstantial arc of a short duration will not result in a level of heat input that will compromise the weld quality. In such embodiments, the welding system and power supply is controlled and operated as described herein with respect to avoiding an arc completely, but the power supplies 170 and 175 are controlled such that, to the extent an arc is created, the arc is insubstantial. In some exemplary embodiments, the power supplies 170 and 175 are operated such that a created arc has a duration of less than 10 ms. In other exemplary embodiments the arc has a duration of less than 1 ms, and in other exemplary embodiments the arc has a duration of less than 300 µs. In such embodiments, the existence of such arcs does not compromise the weld quality because the arc does not impart substantial heat input into the weld or cause significant spatter or porosity. Thus, in such embodiments the power supplies 170 and 175 are controlled such that, to the extent an arc is created, it is kept insubstantial in duration so that the weld quality is not compromised. The same control logic and components as discussed herein with respect to other embodiments can be used in these exemplary embodiments. However, for the upper threshold limit the control unit 195 can use the detection of the creation of an arc, rather than a threshold point (of current, power, voltage, resistance) below a predetermined or predicted arc creation point. Such an embodiment can allow the welding operation to operate closer to its limits.

Figure 2:
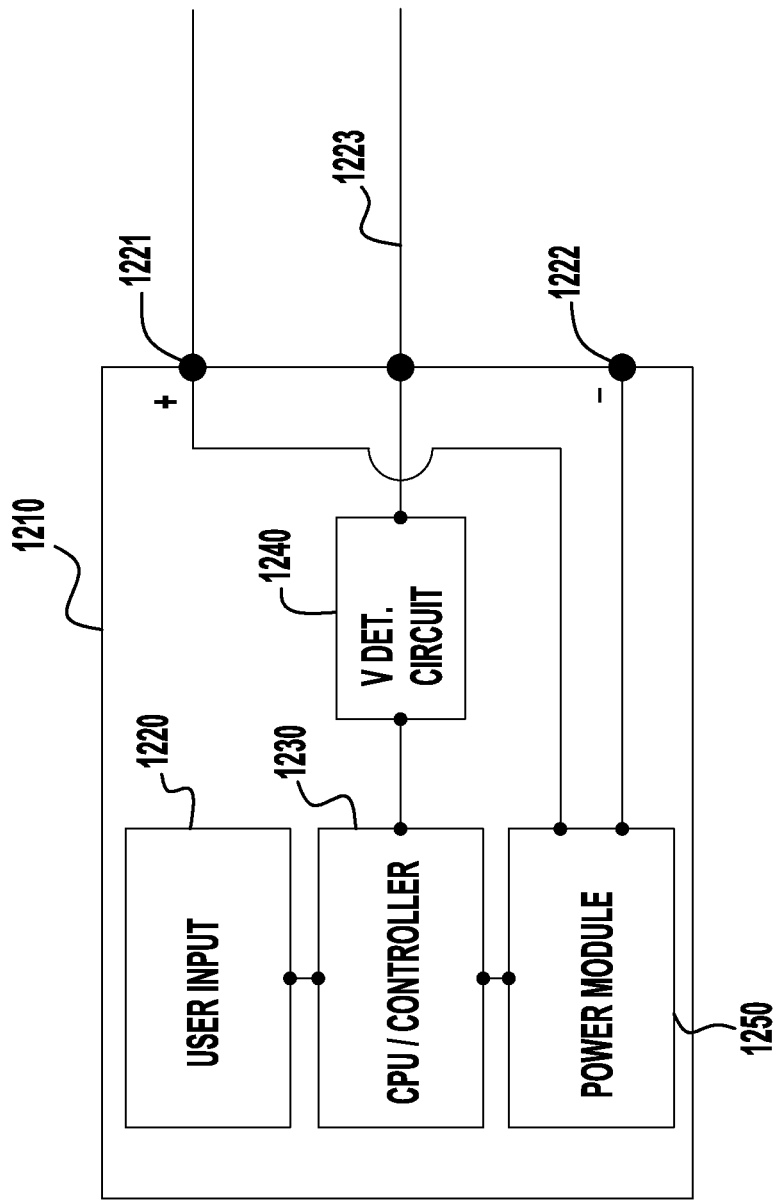
FIG. 2 illustrates an exemplary embodiment of a hot wire power supply.

The above discussion can be further understood with reference to FIG. 2, in which an exemplary hot wire power supply is depicted. The power supply 1210 can be of a type similar to those shown as 170 and 175 in FIG. 1. The power supply 1210 can be of a known welding power supply construction, such as an inverter-type power supply. Because the design, operation and construction of such power supplies are known they will not be discussed in detail herein. The power supply 1210 contains a user input 1220 which allows a user to input data including, but not limited to, wire feed speed, wire type, wire diameter, a desired power level, a desired wire temperature, voltage and/or current level. Of course, other input parameters can be utilized as needed. The user interface 1220 is coupled to a CPU/controller 1230 which receives the user input data and uses this information to create the needed operational set points or ranges for the power module 1250. The power module 1250 can be of any known type or construction, including an inverter or transformer type module.

The CPU/controller 1230 can determine the desired operational parameters in any number of ways, including using a lookup table. In such an embodiment, the CPU/controller 1230 utilizes the input data, for example, wire feed speed, wire diameter and wire type to determine the desired current level for the output (to appropriately heat the wire 140 (see FIG. 1)) and the threshold voltage or power level (or the acceptable operating range of voltage or power). This is because the needed current to heat the wire 140 to the appropriate temperature will be based on at least the input parameters. That is, an aluminum wire 140 may have a lower melting temperature than a mild steel electrode, and thus requires less current/power to melt the wire 140. Additionally, a smaller diameter wire 140 will require less current/power than a larger diameter electrode. Also, as the wire feed speed increases (and accordingly the deposition rate) the needed current/power level to melt the wire will be higher.

Similarly, the input data will be used by the CPU/controller 1230 to determine the voltage/power thresholds and/or ranges (e.g., power, current, and/or voltage) for operation such that the creation of an arc is avoided. For example, for a mild steel electrode having a diameter of 0.045 inches can have a voltage range setting of 6 to 9 volts, where the power module 1250 is driven to maintain the voltage between 6 to 9 volts. In such an embodiment, the current, voltage, and/or power are driven to maintain a minimum of 6 volts—which ensures that the current/power is sufficiently high to appropriately heat the electrode—and keep the voltage at or below 9 volts to ensure that no arc is created and that a melting temperature of the wire 140 is not exceeded. Of course, other set point parameters, such as voltage, current, power, or resistance rate changes can also be set by the CPU/controller 1230 as desired.

The positive terminal 1221 of the power supply 1210 is coupled to the contact tube, i.e., either contact tube 160 or 165 (see FIG. 1), and the negative terminal of the power supply is coupled to the workpiece 115. Thus, a heating current is supplied through the positive terminal 1221 to the wire 140 and returned through the negative terminal 1222. Such a configuration is generally known. Of course, in another exemplary embodiment the negative terminal 1222 can also be connected to the contact tube.

A feedback sense lead 1223 is also coupled to the power supply 1210. This feedback sense lead can monitor voltage and deliver the detected voltage to a voltage detection circuit 1240. The voltage detection circuit 1240 communicates the detected voltage and/or detected voltage rate of change to the CPU/controller 1230 which controls the operation of the module 1250 accordingly. For example, if the voltage detected is below a desired operational range, the CPU/controller 1230 instructs the module 1250 to increase its output (current, voltage, and/or power) until the detected voltage is within the desired operational range. Similarly, if the detected voltage is at or above a desired threshold the CPU/controller 1230 instructs the module 1250 to reduce or shut off the flow of current so that an arc is not created. If the voltage drops below the desired threshold, the CPU/controller 1230 instructs the module 1250 to supply a current or voltage, or both to continue the welding process. Of course, the CPU/controller 1230 can also instruct the module 1250 to maintain or supply a desired power level.

It is noted that the detection circuit 1240 and CPU/controller 1230 can have a similar construction and operation as the control unit 195 shown in FIG. 1 and discussed above. In addition, while a voltage detection circuit 1240 has been illustrated, power supply 1210 may also include a current detection circuit. In exemplary embodiments of the present invention, the sampling/detection rate is at least 10 KHz. In other exemplary embodiments, the detection/sampling rate is in the range of 100 to 200 KHz.

Figure 3:
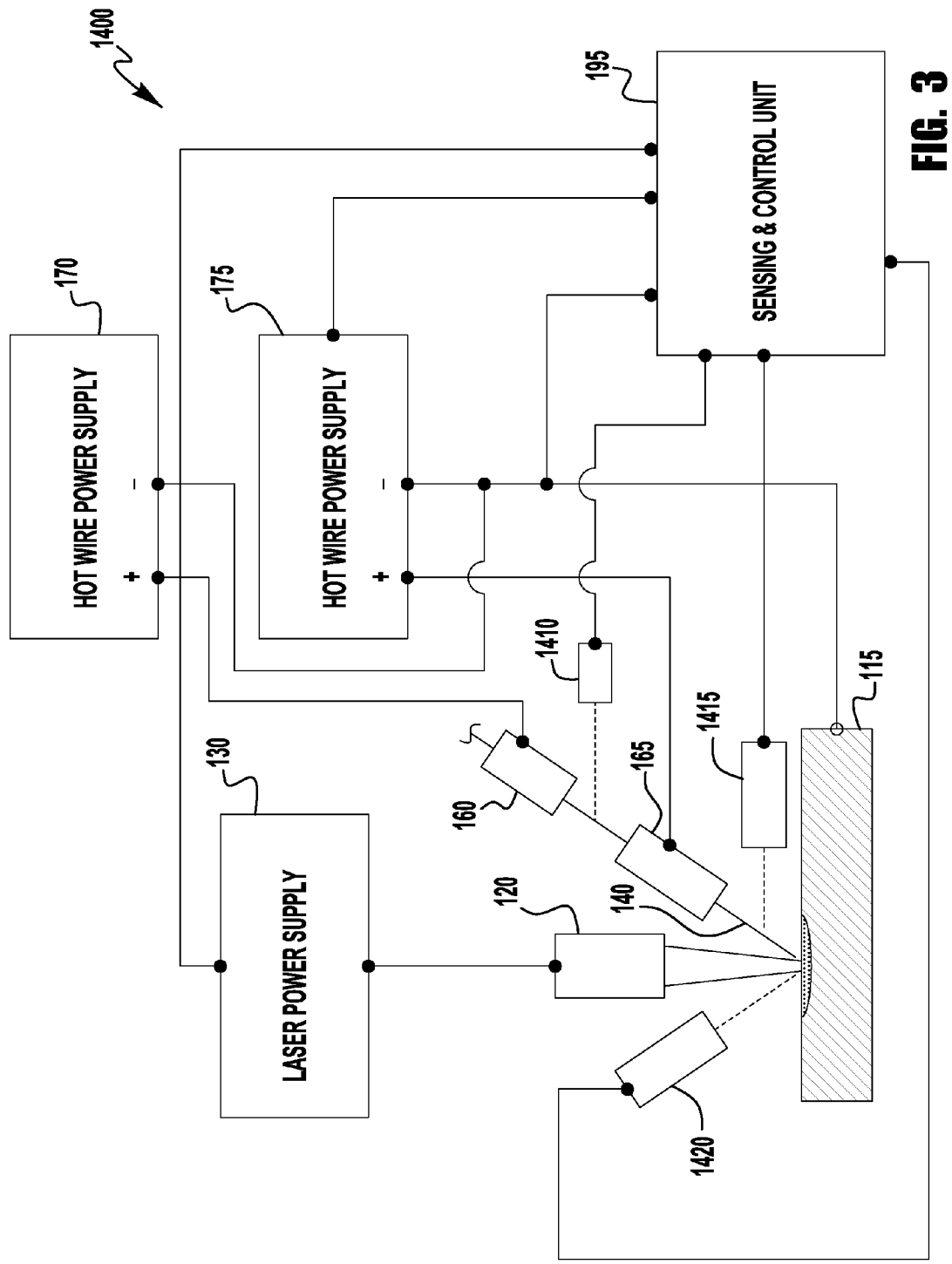
FIG. 3 illustrates a functional schematic block diagram of an exemplary embodiment of a combination filler wire feeder and energy source system for any of brazing, cladding, building up, filling, hard-facing overlaying, and joining/welding applications.

FIG. 3 depicts yet another exemplary embodiment of the present invention. FIG. 3 shows an embodiment similar to that as shown in FIG. 1. However, certain components and connections are not depicted for clarity. For example, the voltage and current inputs to sensing and control unit 195 are not shown. FIG. 3 depicts a system 1400 in which thermal sensors 1410 and 1415 are utilized to monitor the temperature of the wire 140. The thermal sensors 1410 and 1415 can be of any known type capable of detecting the temperature of the wire 140. The sensors can make contact with the wire 140 or can be coupled to the tip of contact tube 160 or 165 so as to detect the temperature of the wire 140 at the tip. In a further exemplary embodiment of the present invention, the sensors 1410 and 1415 are of a type which uses a laser or infrared beam that is capable of detecting the temperature of a small object—such as the diameter of a filler wire—without contacting the wire 140. Sensor 1410 can be positioned such that the temperature of the wire 140 can be detected at some point between the end of the tip contact tube 160 and contact tube 165. Similarly, sensor 1415 can be positioned such that the temperature of the wire 140 can be detected at some point between the end of the tip contact tube 165 and the weld puddle 145. The sensors 1410 and 1415 should also be positioned such that the sensors do not sense the temperature of weld puddle 145.

The sensors 1410 and 1415 are coupled to the sensing and control unit 195 (discussed with regard to FIGS. 1 and 2) such that, based on the temperature feedback information, control of power supplies 170 and 175 and/or the laser power supply 130 can be optimized. For example, the voltage, power, or current output of the power supply 170 can be adjusted based on at least the feedback from the sensor 1410, and the voltage, power, or current output of the power supply 175 can be adjusted based on at least the feedback from the sensor 1415.

That is, in an embodiment of the present invention either the user can input a desired temperature setting (for a given weld and/or wire 140) or the sensing and control unit can set a desired temperature based on other user input data (wire feed speed, electrode type, etc.) and then the sensing and control unit 195 would control power supplies 170 and 175 to maintain the desired temperatures at the tips of contact tubes 160 and 165, respectively.

In the above embodiments, it is possible to account for heating of the wire 140 that may occur due to the laser beam 110 impacting on the wire 140 before the wire enters the weld puddle. In some embodiments of the present invention, the temperature of the wire 140 can be controlled only by adjusting the output current or power from power supplies 170 and 175. However, in other embodiments at least some of the heating of the wire 140 can come from the laser beam 110 impinging on at least a part of the wire 140. As such, the current or power from the power supplies 170 and 175 alone may not be representative of the temperature of the wire 140. Accordingly, utilization of the sensor 1410 and 1415 can aid in regulating the temperature of the wire 140 through control of the power supplies 170 and 175 and/or the laser power supply 130.

In a further exemplary embodiment (also shown in FIG. 3) a temperature sensor 1420 is directed to sense the temperature of the weld puddle. In this embodiment the temperature of the weld puddle is also coupled to the sensing and control unit 195. Accordingly, in some embodiments of the present invention, control unit 195 may use the feedback from one or more temperature sensors 1410, 1415, and 1420 to make the necessary adjustments to power supply 170 to maintain the temperature at the tip of contact tube 160 at the desired temperature. In some exemplary embodiments, power supply 170 can be a high inductance power supply. As such it can provide a stable current flow despite minor disturbances in the welding process. It, of course, should be noted that since the consumable 140 has a stick-out (from tube 160) which is larger than typical stick-out (because of its distance from the end of the filler wire 140), it may be needed to use a current level which compensates for any temperature drop due to this distance.

Similarly, in some exemplary embodiments, control unit 195 may use the feedback from one or more temperature sensors 1410, 1415, and 1420 to control the output current from power supply 175 to maintain the temperature at the tip of contact tube 165 at the desired temperature. In some exemplary embodiments, power supply 175 is low inductance power supply. As such, power supply 175 will be responsive to the control signals from control unit 195 in maintaining the temperature at the tip of contact tube 165 at the desired temperature. In a non-limiting embodiment, the desired temperature at the tip of contact tube 165 will be at or near the meting point of filler wire 140.

In another exemplary embodiment of the present invention, the sensing and control unit 195 can be coupled to a feed force detection unit (not shown) which is coupled to the wire feeding mechanism (not shown—but see 150 in FIG. 1). The feed force detection units are known and detect the feed force being applied to the wire 140 as it is being fed to the workpiece 115. For example, such a detection unit can monitor the torque being applied by a wire feeding motor in the wire feeder 150. If the wire 140 passes through the molten weld puddle 145 without fully melting it will contact a solid portion of the workpiece and such contact will cause the feed force to increase as the motor is trying to maintain a set feed rate. This increase in force/torque can be detected and relayed to the control unit 195 which utilizes this information to adjust the voltage, current and/or power to the wire 140 to ensure proper melting of the wire 140 in the puddle 145.

In addition, although not illustrated in FIG. 3 for clarity, the control unit 195 is capable of measuring voltages ($V_1$, $V_2$) and currents ($I_1$, $I_2$), as shown in FIG. 1. As discussed above, the sensing and control unit 195 is capable of calculating resistance values (R=V/I) and/or power values (P=V*I) from the measured voltages and currents. Accordingly, along with controlling the temperature of wire 140 as discussed above, control unit 195 can also incorporate the voltage, current and/or power measurements to ensure that the wire 140 maintains contact with the workpiece 115 and no arc is generated. In addition, application Ser. No. 13/212,025, titled "Method And System To Start And Use Combination Filler Wire Feed And High Intensity Energy Source For Welding" and incorporated by reference in its entirety, provides start-up and post start-up control algorithms that may be incorporated in sensing and control unit 195.

In FIGS. 1 and 3 the laser power supply 130, hot wire power supply 170, hot wire power supply 175, and sensing and control unit 195 are shown separately for clarity. However, in embodiments of the invention these components can be made integral into a single welding system. Aspects of the present invention do not require the individually discussed components above to be maintained as separately physical units or stand alone structures.

Figure 4:
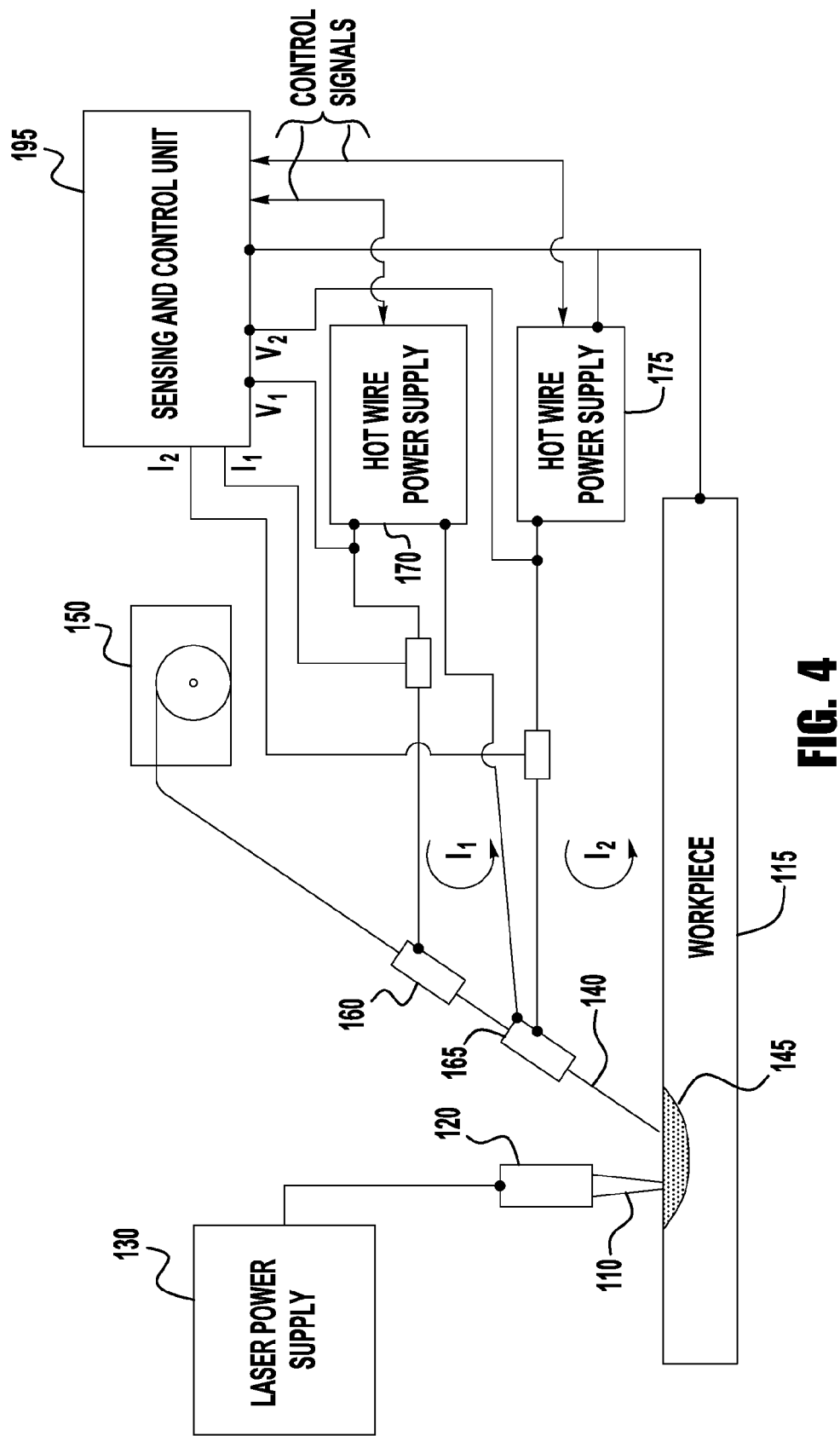
FIG. 4 illustrates a functional schematic block diagram of another exemplary embodiment of a combination filler wire feeder and energy source system for any of brazing, cladding, building up, filling, hard-facing overlaying, and joining/welding applications.

Turning now to FIG. 4, a further exemplary embodiment of a system is shown. This system is very similar to that shown in FIG. 1, and as such the similarities will not be discussed. However, in this embodiment, the power supply 170 passes current through the tube 160 into the wire 140 and through the tube 165 as shown. Thus, this current $I_1$ is used to heat the wire 140 between the tubes 160/165, but provides no (or very little) current flow into the workpiece. Thus, this current $I_1$ provides significant heating but will not contribute to the maintenance or creation of an arc. In exemplary embodiments of the present invention, the current $I_1$ is maintained at a constant level, and the current $I_2$ from the power supply 175 is used to provide the final heating as described herein. In such embodiments, the current $I_2$ is passed into the workpiece and because this current has a lower level the chances of creating an arc is reduced. Thus, embodiments of the invention with this configuration can provide high levels of heating with little or no probability of creating or sustaining an arc. The current $I_2$ from power supply 175 can be a pulsed or a constant current signal. In exemplary embodiments of the present invention, the first heating current $I_1$ can heat up the wire 140 to a first portion of the wire melting temperature while the second current $I_2$ heats up the wire 140 to the desired temperature. For example, in an exemplary embodiment of the present invention, the first current $I_1$ heats up the wire to in the range of 50% to 95% of the wire's melting temperature, while in other embodiments first current $I_1$ heats up the wire 140 to in the range of 75% to 95% of its melting temperature.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A system for controlling heating current for hot-wire processes, the system comprising:
   a high intensity energy source which heats at least one workpiece to create a molten puddle; and
   a feeder subsystem comprising,
      a wire feeder which feeds a filler wire to said molten puddle,
      a first power supply which supplies a first current through a first length of said filler wire, and
      a second power supply which supplies a second current through a second length of said filler wire,
      wherein said first power supply is a high-inductance power supply and said second power supply is a low-inductance power supply,
      wherein said first current and said second current provide a power sufficient to resistance-heat said filler wire to at or near a melting temperature of said filler wire,
      wherein said first power supply provides more than 50% of the power, and
      wherein said first length is different than said second length.

2. The system of claim 1, wherein said first power supply provides 75% to 95% of said power.

3. The system of claim 1, wherein said second power supply has an inductance in a range of 40 to 70 micro henries with a saturation current in a range of 20 to 50 amps, and
   wherein said first power supply has an inductance that is less than or equal to 100 milli henries with a saturation current in a range of 20 to 50 amps.

4. The system of claim 3, wherein said inductance of said first power supply is in a range of 15 to 80 milli henries.

5. The system of claim 1, further comprising:
a sensing and control unit which senses when said filler wire is in contact with said molten puddle, said sensing and control unit operatively connected to at least one of said first power supply and said second power supply to control at least one of said first current and said second current, respectively, in response to said sensing.

6. The system of claim 5, wherein said sensing and control unit measures at least one of a voltage at and a current through said filler wire in order to sense when said filler wire is in contact with said molten puddle, and
wherein said sensing and control unit first controls said second current before controlling said first current in response to said sensing.

7. The system of claim 1, wherein said feeder subsystem further comprises a first contact tube and a second contact tube in a dual contact tube configuration for receiving said filler wire, each contact tube electrically connecting said first power supply and said second power supply, respectively, to said filler wire.

8. The system of claim 7, wherein a path of said first current includes said at least one workpiece.

9. The system of claim 7, wherein a path of said first current does not include said at least one workpiece.

10. The system of claim 1, wherein said feeder controls said filler wire such that said filler wire maintains contact with said molten puddle in order to minimize arcing between said filler wire and said molten puddle.

11. A method of controlling heating current for hot-wire processes, the method comprising:
heating at least one workpiece to create a molten puddle;
feeding a filler wire to said molten puddle;
supplying a first current through a first length of said filler wire; and
supplying a second current through a second length of said filler wire,
wherein said first current is supplied using a first power supply that is a high-inductance power supply and said second current is supplied using a second power supply that is a low-inductance power supply,
wherein said first current and said second current provide a power sufficient to resistance-heat said filler wire to at or near a melting temperature of said filler wire,
wherein said first current provides more than 50% of the power, and
wherein said first length is different than said second length.

12. The method of claim 11, wherein said first current provides 75% to 95% of the power.

13. The method of claim 10, wherein the second power supply has an inductance in a range of 40 to 70 micro henries with a saturation current in a range of 20 to 50 amps, and
wherein said first power supply has an inductance that is less than or equal to 100 milli henries with a saturation current in a range of 20 to 50 amps.

14. The method of claim 13, wherein said inductance of said first power supply is in a range of 15 to 80 milli henries.

15. The method of claim 11, further comprising:
sensing when said filler wire is in contact with said molten puddle; and
controlling at least one of said first current and said second current in response to said sensing.

16. The method of claim 15, wherein said sensing comprises measuring at least one of a voltage at and a current through said filler wire in order to sense when said filler wire is in contact with said molten puddle, and
wherein said controlling comprises first controlling said second current before said first current in response to said sensing.

17. The method of claim 16, wherein a path of the first current includes said at least one workpiece.

18. The method of claim 16, wherein a path of the first current does not include said at least one workpiece.

* * * * *